US012664387B2

(12) United States Patent
Steinbuch et al.

(10) Patent No.: US 12,664,387 B2
(45) Date of Patent: Jun. 23, 2026

(54) READING AN OPTICAL CODE

(71) Applicant: SICK AG, Waldkirch (DE)

(72) Inventors: Jonathan Steinbuch, Waldkirch (DE);
Vicky Hallmann, Waldkirch (DE);
Sofia Baer, Waldkirch (DE)

(73) Assignee: SICK AG, Waldkirch (DE)

( * ) Notice: Subject to any disclaimer, the term of this
patent is extended or adjusted under 35
U.S.C. 154(b) by 0 days.

(21) Appl. No.: 19/038,592

(22) Filed: Jan. 27, 2025

(65) Prior Publication Data

US 2025/0265432 A1     Aug. 21, 2025

(30) Foreign Application Priority Data

Feb. 21, 2024     (EP) ..................................... 24158903

(51) Int. Cl.
G06K 7/14               (2006.01)
(52) U.S. Cl.
CPC ......... G06K 7/1473 (2013.01); G06K 7/1417
(2013.01); G06K 7/1447 (2013.01); G06K
7/1452 (2013.01); G06K 7/1465 (2013.01)
(58) Field of Classification Search
CPC .. G06K 7/1473; G06K 7/1417; G06K 7/1447;
G06K 7/1452; G06K 7/1465; G06K
7/1491
See application file for complete search history.

(56) References Cited

U.S. PATENT DOCUMENTS 6,394,349 B1     5/2002 Shigekusa et al.
6,685,095 B2     2/2004 Roustaei et al.

8,000,514 B2 *   8/2011 Nepomniachtchi .... G06V 10/20
                                                    382/137
2002/0041712 A1   4/2002 Roustaei et al.
2007/0272755 A1 * 11/2007 Chang ....................... G06K 7/14
                                                    235/494
2014/0032406 A1 *  1/2014 Roach .................. G06Q 20/042
                                                    705/42
2015/0092051 A1 *  4/2015 Furukawa ............... G06T 7/254
                                                    348/143
2017/0098306 A1 *  4/2017 Nasu .................. G01D 5/34776

FOREIGN PATENT DOCUMENTS

EP          1383063  A1      1/2004
EP          3428835  A1      1/2019

OTHER PUBLICATIONS

Search Report dated Jul. 17, 2024 issued in corresponding European
Application No. 24158903.5.
Sofair, Probability of miscorrection for Reed-Solomon codes, Con-
ference Paper, Feb. 2000.

* cited by examiner

*Primary Examiner* — Matthew Mikels
(74) *Attorney, Agent, or Firm* — Nath, Goldberg &
Meyer; Jerald L. Meyer

(57)               ABSTRACT

A method of reading an optical code (20); is provided, the
method comprising the steps of recording image data having
the optical code (20); determining defects (30), and evalu-
ating the image data by reading the code words. In this
respect, the defects (30) are determined using an edge
criterion and/or a binarization criterion, wherein the edge
criterion evaluates whether there is a code module in an
edge-free region of the image data that is larger than a
specified multiple of the module size, and wherein the
binarization criterion evaluates whether a code module
having gray scale values close to a binarization threshold has
been recorded.

14 Claims, 4 Drawing Sheets

20

20

READING AN OPTICAL CODE

Figure 1:
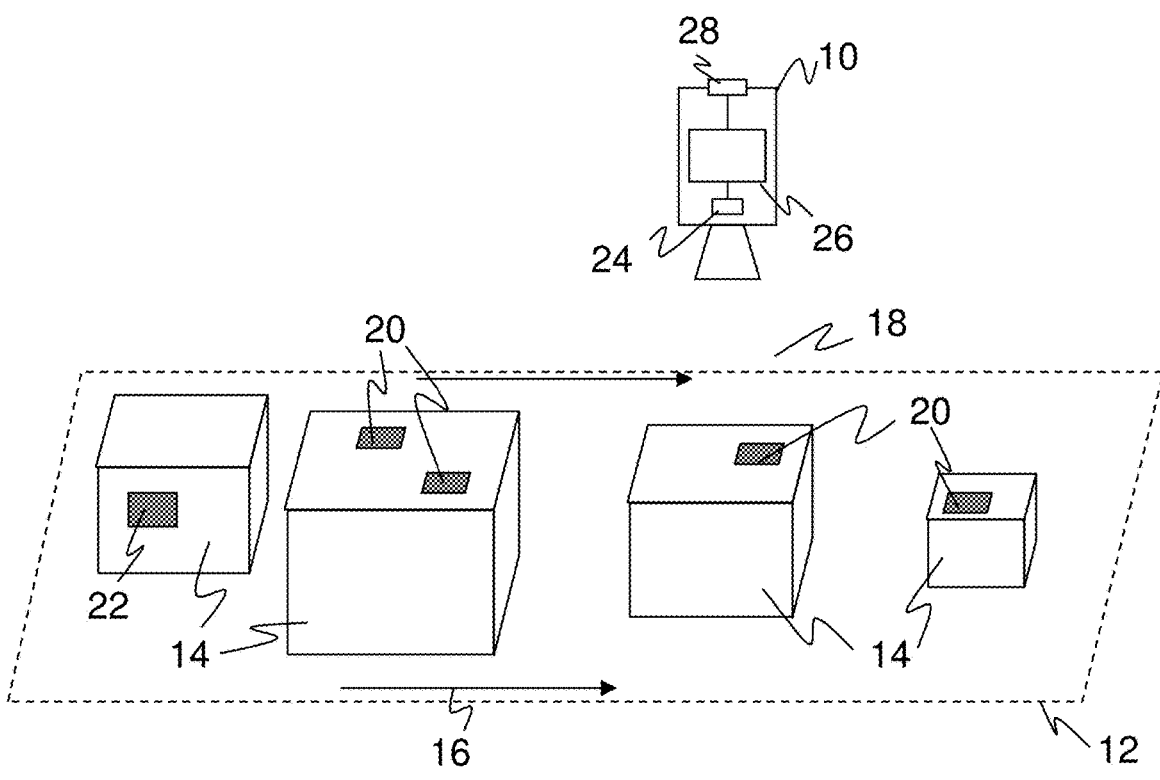

The invention relates to a method of reading an optical code and to an optoelectronic reader.

Code readers are known from supermarket checkouts, for automatic parcel identification, for sorting mail shipments, from baggage handling at airports, and from other logistics applications. In a code scanner, a reading beam is guided transversely over the code by means of a rotating mirror or by means of a polygon mirror wheel. A camera-based code reader takes images of the objects having the codes located thereon by means of an image sensor and image evaluation software extracts the code information from these images.

In an important application group, the objects bearing the code are conveyed past the code reader. A scanning code reader here detects the respective codes successively led into its reading zone. Alternatively, in a camera based code reader, a line scan camera reads the object images having the code information successively and linewise with the relative movement. As a rule, image data are recorded using a two-dimensional image sensor that overlap more or less depending on the recording frequency and on the conveying speed. So that the objects can be arranged in any desired orientation on the conveyor, a plurality of code readers are often provided at a reading tunnel to record objects from a plurality of sides or from all sides. A scanning code reader also detects the remission and thus ultimately the image lines that can be assembled to form an object image, even though an image sensor is preferred for this purpose in practice. Code regions can be identified in such an object field and one-dimensional or two-dimensional codes can be read.

A high reading rate is one of the most important quality criteria for a code reader or for a reading tunnel. Reading errors make complex error remedies necessary such as the repeat manual scanning or a resorting. In practice, however, faults frequently occur in the code zone that are here called defects in summary and that make reading more difficult or prevent it. In this respect, there are different causes for a defect such as a mechanical strain on the code due, for instance, to damage, poor printing or contamination, a covering of code parts, or optical impairments such as reflections, blur, or low contrast.

To avoid reading errors, conventional decoders for two-dimensional codes such as DataMatrix, QR, Aztec, Maxi-code, Dot Code, or also stack codes such as PDF417 and MicroPDF, are equipped with a Reed-Solomon correction. This enables a powerful correction process by which codes also having larger area defects are still read correctly. If, however, the error correction capacity is exceeded, for example with numerous or larger defects, a reading of the code is also no longer possible with a Reed Solomon correction.

A method of reading an optical code is advanced in EP 3 428 835 A1 in which a code word is replaced with a code word known for a position at at least one position of the code in a pre-correction that is positioned upstream of the check process. The known code words are parameterized, are specified by a database of a higher ranking system, or are taught from a history of read codes. This is a pre-correction that is intended to complement a subsequent Reed-Solomon correction. The recognition of defects is, however, not looked at here.

The decoding of damaged codes is discussed in U.S. Pat. No. 6,685,095 B2. It is recognized when expected code features are missing or damaged such as a finder pattern or a perimeter. Such errors are then marked for a subsequent Reed-Solomon correction to increase its error correction capacity. This procedure is, on the one hand, only possible with already binarized, that is black and white, code images and is therefore sensitive toward binarization errors. In addition, only certain errors are recognized that relate to the expected code features.

The paper by Sofair, Isaac, "Probability of miscorrection for reed-solomon codes", Proceedings International Conference on Information Technology: Coding and Computing (Cat. No. PR00540 IEEE, 2000) gives probabilities for error corrections of a Reed-Solomon process. However, this does not improve the code reading.

It is therefore the object of the invention to improve the reading of codes having defects.

This object is satisfied by a method of reading an optical code and by an optoelectronic code reader in accordance with the respective independent claim.

The method is a computer implemented method that runs, for example, on a processing unit of a code reader or of another sensor detecting the image data, and/or a connected processing unit. The optical code, preferably one of the codes named in the introduction with Reed-Solomon correction words and in particular a 2D code, has a first plurality of code words. A code word is in turn composed of a second plurality of code modules, for example eight code modules that each encode a bit individually via light and dark and together a byte or eight bits of the code word. The code words are translated into respective characters of the code content communicated by the optical code as part of the reading or decoding.

To read the code, image data having the optical code are first recorded in one of the known manners described in the introduction. It is strictly speaking only a code candidate since whether it is a readable, complete code will only be determined later. This is not distinguished in terminology here. The image data are preferably tailored to a region of the code by a pre-processing. The module size can now be defined with respect to the image data. This is the extension of a code module in picture elements of the image data that can naturally be indicated in different units and can be estimated using different methods known per se.

Defects are determined in the image data having the optical code, with a defect having already been introduced and at least one code module is not yet or not reliably recognizable in the region of the image data affected by the defect. The image data are then evaluated, preferably, as explained more exactly in the following, while taking account of the defects to read the code words.

The invention starts from the basic idea of determining the defects using an edge criterion, a binarization criterion, or a combination of both criteria. The edge criterion focuses on larger regions without edges that there should not be without defects due to the numerous transitions between code modules. In this respect, the size of the edge-free region is oriented on the module size since there are as intended no edges within a code module and also some code modules that are the same next to and above one another result in freedom from edges. Work is therefore carried out with a multiple of the module size, for instance a twofold, threefold or another, also not whole number, multiple to thus specify how many code modules that are the same can still be considered as regular in the same region and from which size onward an edge-free region is due to a defect. The binarization criterion checks whether a code module has possibly been incorrectly classified in a binarization that has already taken place or that will take place, that is, is light in the binarized image data and dark in reality, or vice versa. The probability for such a binarization error is the higher, the closer the gray scale values of the code module are to a binarization threshold. The region checked for this preferably approximately has the size of a code module since it is primarily the gray scale values of the checked code module that is important, but with the contrast toward adjacent code modules likewise playing a role and the region therefore also being able to be a little larger than a code module. Gray scale value image data are checked for defects by the binarization criterion, i.e. brightnesses are quantified per picture element, for example at the interval [0 . . . 225] so that red, blue, green, or other colored image data can also be called gray scale in this sense. The edge criterion can likewise be applied to gray scale values, alternatively to binarized values.

The invention has the advantage that defects in the optical code to be read are reliably recognized. The criteria applied do not rely on specific code features such as finder patterns or an outer code contour. The edge criterion requires an at least largely correct detection of existing contours. The binarization criterion in particular evaluates whether this condition may be assumed, that is the reliability of the contour detection, so that the two criteria complement one another very well. Since it is thus known where defects are present in the optical code, marking of which code modules or code words are affected by defects can take place in preferred embodiments with a downstream error correction. The error correction in turn exploits its error correction capacity better with knowledge of the number and position of the errors. Twice as many errors effectively become correctable than if the error correction would have to localize the errors itself.

An edge correction in the image data is preferably carried out for the evaluation with the edge criterion, in particular after blur has been artificially produced beforehand. The edges to be evaluated by the edge criterion or the freedom from edges of regions thereby become more easily accessible. In order, where possible, only to detect edges between code modules and no noise artifacts, the image data are preferably blurred beforehand, for example using a Gaussian kernel whose kernel size is oriented on the module size. The edge detection preferably takes place, as already addressed, on gray scale values, but it is also possible to use the module transitions as edges in binarized image data. A method that can be used for this is the Canny algorithm.

The distance from the next edge is preferably determined for at least one picture element per position of a code module, with the edge criterion being deemed satisfied in the respective picture element when the distance corresponds to at least one specified distance. A kind of distance image is thereby produced in which every picture element indicates the distance from the next edge, for example in the 1-norm or 2-norm. The distance image is calculated, for example, with a distance transformation according to Rosenfeld and Pfalz. How large an edge-free surrounding region of each picture element is can be very simple recognized in the distance image so that defects can be located in accordance with the edge criterion by a threshold operation with a specified distance corresponding to the specified size of an edge-free region considered a defect. The distance from the next edge can be calculated for all the picture elements of the recorded image data or only one picture element or a few representative picture elements of the respective code modules are used. The pattern of the code modules results from the module size.

The binarization criterion is preferably deemed satisfied at a picture element when the gray scale value of the picture element remains within an expected fluctuation range around the binarization threshold, in particular within a fraction of a standard deviation of the gray scale values of picture elements in a neighborhood of the picture element. The binarization threshold is typically estimated from a brightness distribution of the image data, globally from all the gray scale values or preferably locally for a respective neighborhood. An associated global or local fluctuation range, in particular a variation or standard deviation, can also be determined in this part. This fluctuation range is a suitable measure to evaluate how close the gray scale values of a code module are to the binarization threshold. If the gray scale values of a code module remain, for example, within half a standard deviation or a different fraction of the standard deviation, the binarization criterion considers the binarization of this code module as unreliable since even small errors would tilt the binarization in the other direction toward light or dark and this is in turn considered an indication of a defect.

The optical code is preferably read using an error correction method, in particular with a Reed-Solomon process. Optical codes can thereby still be correctly read despite the defects. To the extent that the error correction process still has error correction capacities beyond the defects, additional errors of different causes can furthermore be corrected.

The defects are communicated to the error correction process, preferably as additional input values. Which code modules or code words are to be corrected is in particular marked for the error correction process. This simplifies the error correction and therefore makes it possible to correct additional errors. In a Reed-Solomon process, a respective correction word is required to localize an error and a second correction word to find the correct value at this point. If the errors are marked in advance, a correction word is no longer required to localize the respective error. The error correction capacity thus solely available to the actual error correction so that effectively twice as many errors become correctable.

A number of code words affected by defects corresponding to an error correction capacity of the error correction process are preferably communicated to the error correction process. Let the number of correctable errors be equal to r. This is to be understood as an upper limit, on the one hand, since it would not be sensible to demand the correction of more errors because it is clear that the error correction process cannot cope with this. It is additionally advantageous to also exploit the upper limit, that is to communicate as many potential defects as can be corrected. This can also be expressed such that the criteria for a defect are kept just so strict that this upper limit is reached. It is alternatively conceivable to communicate further defects, in particular when the criteria do not indicate any defects at all or only a few defects.

A plurality of reading attempts are preferably made with the error correction process and respective different code words affected by defects are communicated in the reading attempts. If therefore the first selection of code words affected by defects does not yet result in a reading success, other variants can still be tried out. An available decoding time can thereby be sensibly used and the reading rate is further increased again.

A decision as to which code words affected by defects are communicated to the correction process is preferably made according to a confidence value. The defects or the code words affected thereby are thus prioritized using the confidence values. A minimum threshold is, for example, applied to the confidence value and an $r_{max}$ selection is made from among the remaining defects. They are in particular the $r_{max}$ defects having the highest confidence values. It is conceivable to consecutively try a decoding with different $r_{max}$ selections as long as there is no reading success and decoding time is still available that is actually limited in real time applications. If there are more than Imax defects of high confidence, it can also be the basis for a decision that this code is generally no longer readable.

The confidence value is preferably calculated from the edge criterion and/or from the binarization criterion. The two criteria can thus be used individually or together to evaluate whether a code word is to be considered defective due to a defect or not.

The edge criterion preferably contributes to the confidence value in accordance with the formula $$1-\left(\frac{1}{2}\right)^{n_1},$$

where $n_1$ is the number of code modules affected by a defect. A comparison is thus made with this formula that n1 same code modules occur randomly after one another, caused as part of a regular code and not by defects.

The binarization criterion preferably contributes the more to the confidence value, the closer the gray scale value of the picture element looked at with the binarization criterion is to the binarization threshold. The confidence value thus quantifies the distance from the binarization threshold, either linearly or with a different weighting. A code module is accordingly the more likely incorrectly binarized and is thus to be considered a defect, the closer its gray scale values come to the binarization threshold.

In a preferred further development, an optoelectronic code reader, preferably a camera based code, is provided having at least one light reception element for the generation of image data from received light and having an internal and/or external control and evaluation unit in which a method in accordance with the invention for reading optical codes is implemented. The image detection takes place, as described in the introduction, using an image sensor with pixels arranged in matrix form, by a line sensor in a relative movement toward the optical code or in a scanning manner.

Figure 2:
Figure 3:
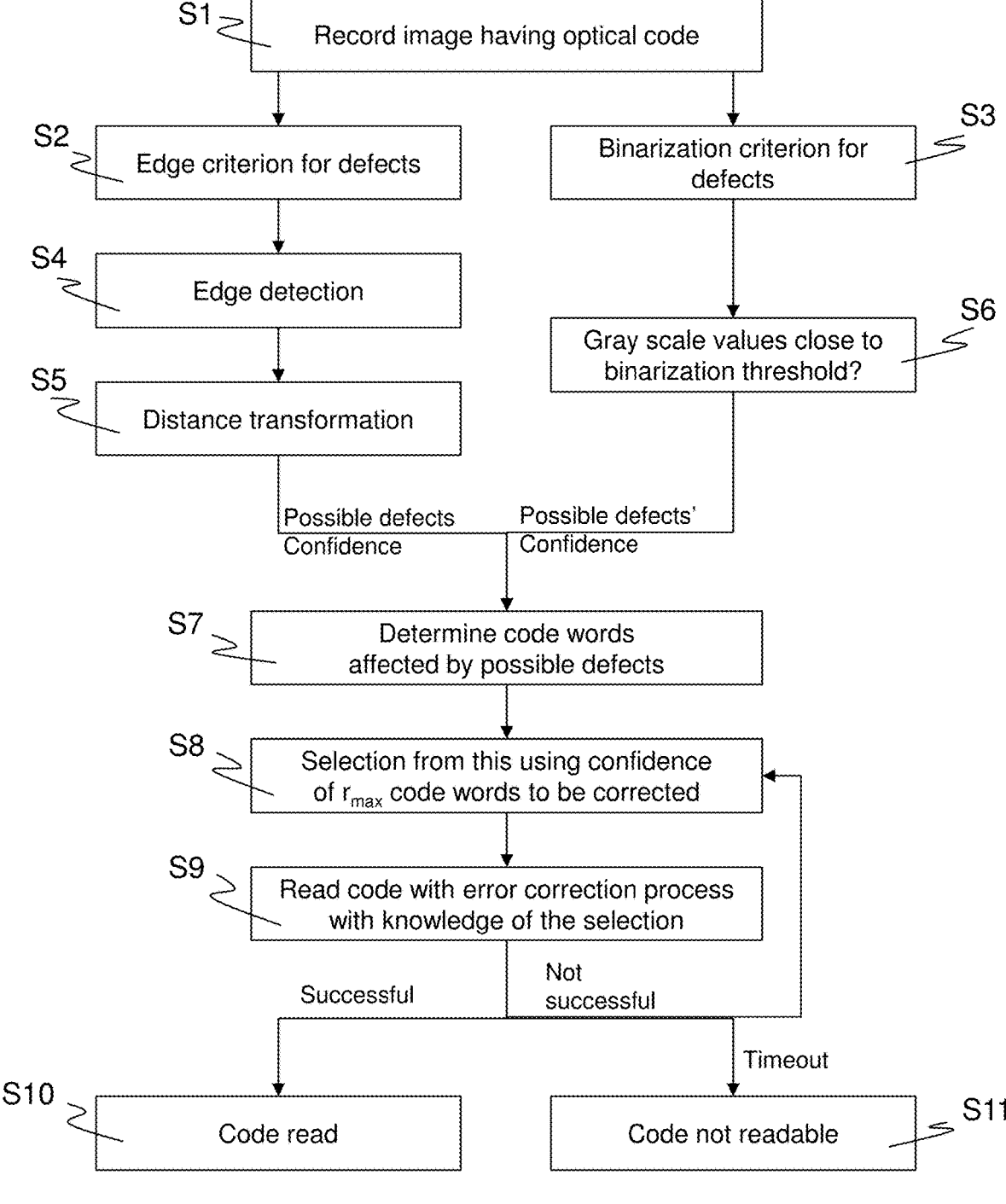
Figure 4:
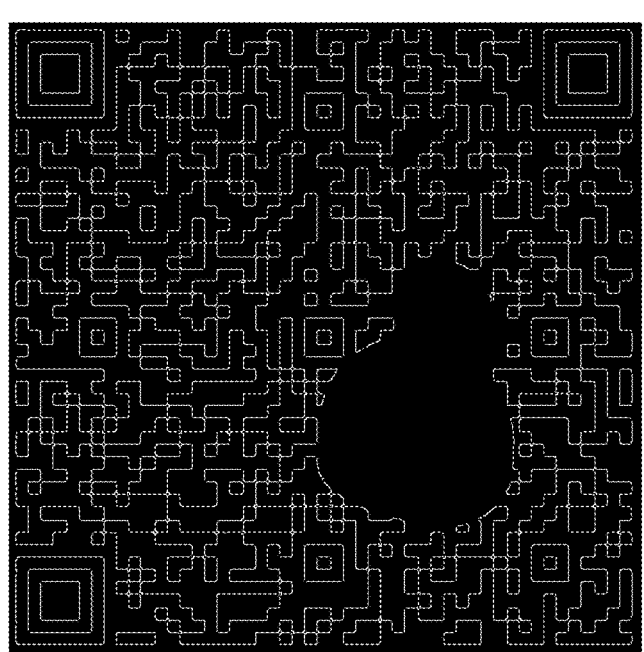
Figure 5:
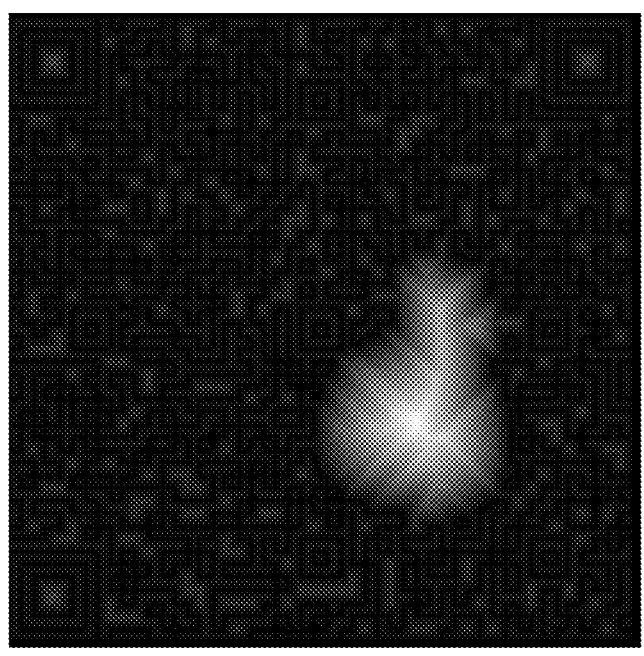
Figure 6:

The invention will be explained in more detail in the following also with respect to further features and advantages by way of example with reference to embodiments and to the enclosed drawing. The Figures of the drawing show in:

FIG. 1 a schematic overview representation of a code reader that is installed by way of example above a conveyor belt on which objects having optical codes to be read are conveyed;

FIG. 2 an exemplary optical code with a defect of a larger area here;

FIG. 3 an exemplary flowchart for recognizing defects and for reading optical codes while taking account of defects;

FIG. 4 a representation of an edge image with respect to the optical code in accordance with FIG. 2;

FIG. 5 a representation of distance transformation applied to the edge image in accordance with FIG. 4; and FIG. 6 an illustration of the defect recognized in the optical code in accordance with FIG. 2.

FIG. 1 shows an optoelectronic code reader 10 which is mounted above a conveyor belt 12 which conveys objects 14 through the detection zone 18 of the code reader 10, as indicated by the arrow 16. The objects 14 bear optical codes 20 on their outer surfaces which are detected and evaluated by the code reader 10. The optical codes 20 are preferably codes having a Reed-Solomon encoding as already mentioned in the introduction by way of example and they are applied in any desired manner, in particular directly on an object 14 or via a label.

The optical codes 20 can only be recognized by the code reader 10 when they are affixed to the upper side or at least in a manner visible from above. Differing from the representation in FIG. 1, a plurality of code readers 10 can be installed from different directions for the reading of a code 22 affixed to the side or to the bottom, for instance, in order to permit a so-called omnireading from all directions. The arrangement of the plurality of code readers 10 to form a reading system mostly takes place as a reading tunnel in practice. This stationary use of the code reader 10 at a conveyor belt is very common in practice. The invention, however, relates to the reading of codes or to the code reader 10 itself so that this example may not be understood as restrictive. Codes can also be scanned by hand, for example, or a code or an object 14 having a code can be held in the reading field of the code reader 10 in a presentation application.

The code reader 10 detects image data of the conveyed objects 14 and of the optical codes 20 by a light receiver 24 and said image data are further processed by a control and evaluation unit 26 by means of image evaluation and decoding processes. The control and evaluation unit 22 comprises, for example, at least one processing module such as a microprocessor or a CPU (central processing unit), an FPGA (field programmable gate array), a DSP (digital signal processor), an ASIC (application specific integrated circuit), an AI processor, an NPU (neural processing unit), a GPU (graphics processing unit), a VPU (video processing unit), or the like. It is not the specific imaging process that is furthermore important for the invention so that the code reader 10 can be set up in accordance with any principle known per se. For example, only one respective line is detected, either by means of a linear image sensor or by means of a scanning process, and the control and evaluation unit assembles the lines detected in the course of the conveying movement to the image data. A larger zone can already be detected in a recording fusing a matrix-like image sensor, with the assembly of recordings here also being possible both in the conveying direction and transversely thereto. The central function of the code reader 10 is the decoding, i.e. the reading of the message encoded in an optical code as clear text. The code reader 10 outputs information via an interface 28 such as messages or image data read from the codes.

The recognition of defects, preferably with a subsequent reading of an optical code 20 will be explained in the following with reference to FIGS. 2 to 6. It takes place in the control and evaluation unit 26 n a preferred embodiment. It is, however, equally conceivable to output image data or intermediate results via the interface 28 and to outsource at least some of the recognition of defects and decoding to a higher ranking system such as a control processor, a network, or a cloud. Pre-processing the image data for the segmentation and location of code regions having the optical codes 20 and the error correction, in particular by means of the Reed-Solomon process, and the decoding per se are required as known and will not be described in detail.

FIG. 2 shows an exemplary optical code 20 having a defect 30. In this case, it is an erasure. The actual cause of the defect 30 is not relevant to the invention; by way of example, the defect 30 can be due to the optical code 20 itself such as an imperfect print, contamination, covering over or a reflection, the recording situation, or the code reader 10. The defect 30 is shown contiguous mainly for illustration and to this degree; in accordance with the invention, a plurality of defects 30, such as smaller ones, are likewise recognized. It is accordingly to be understood as an example, with it also not being important whether the optical code 20 is still readable with such an extended defect. In contrast, recognizing this can be an advantage of the procedure in accordance with the invention.

FIG. 3 shows an exemplary flowchart for recognizing defects 30 and for reading optical codes 20 while taking account of defects 30. The total code is called the optical code 20, which is also called a symbol in connection with code reading. A code word is a singe character of the optical code 20 that is composed, for example, of eight code modules or bits. It must be noted that this terminology differs from that of encoding theory in which the Reed-Solomon error correction is actually based. A code word would be called a symbol in encoding theory.

In a step S1, an image having an optical code 20 or having a potential optical code, or a code candidate is recorded. A rectangular, axis-oriented portion is acquired from this by pre-processing steps known per se, said portion covering the optical code 20 and which the further recognition can restrict itself to.

In steps S2 and S3, the flowchart divides into two paths that can be worked through consecutively or in parallel with one another; or there can also be embodiments in which only one of the paths is present. Defects 30 are consequently recognized with reference to an edge criterion or to a binarization criterion. The edge criterion finds larger edge-less zones that in particular indicate the lack of code modules due to an erasure, whereas the binarization criterion is associated with low contrast and finds zones in which the distinction between light and dark is not reliable and there is accordingly an increased probability of an incorrect binarization.

In a step S4, an edge detection takes place for the evaluation using the edge criterion. Artificial blur is preferably generated beforehand to wash out any noise and to only obtain significant edges. A Gaussian filter is suitable for this, for example, whose width is selected in dependence on the module size and on the amount of the noise so that actually only noise artifacts and not code modules are washed out. One possible edge detector that follows this procedure is the Canny algorithm, with other edge detects known per so also being able to be used. FIG. 4 shows a representation of an edge image with respect to the optical code in accordance with FIG. 2.

Depending on the embodiment, edges can be recognized in a gray scale image or the module transitions in a binarized image are used as edges. It is furthermore conceivable to restrict the application of the edge criterion to module scanning points. Not all the picture elements are then looked at, but rather only one or a few representative picture elements per code module. The pattern of such module scanning points corresponding to the code modules can be derived from the module size.

In a step S5, the distance from the next edge is calculated from the edge image per picture element. This can again be applied to all the picture elements or only to module scanning points. For example, the distance transformation according to Rosenfeld and Pfalz are used for this purpose, with other processes also being possible. FIG. 5 shows an illustration of a distance transformation applied to the edge image in accordance with FIG. 4, with lighter picture elements standing for larger distances in this illustration. The lighter a picture element therefore is, the larger an edge-less zone in which this picture element is located. A threshold preferably dependent on the module size can thus be set to locate defects 30 in accordance with the edge criterion. The threshold should be high enough to distinguish defects 30 from regular accumulations of code modules of the same type. FIG. 6 shows an illustration of the defect 30 recognized in the optical code in 20 accordance with FIG. 2. A respective confidence value is preferably also determined for the found defects 40 that evaluates the reliability that this is actually a defect 30 in the sense that a code word is here actually not reliably readable due to a defect 30. A comparison is in particular made for this purpose with the probability that code modules of the same type as one another have accumulated regularly, as explained below.

In a step S6, whether the gray scale values of a code module are close to a binarization threshold is evaluated by the binarization criterion since there is an increased probability in this case that this code module has been incorrectly binarized. The binarization threshold is the limit value that decides whether a respective picture element is classified as light or dark on a binarization or generation of a black and white image from a gray scale image. The binarization threshold can be derived, for example, from a brightness distribution or gray scale value distribution. A fluctuation range or a standard deviation can thus also be given for the binarization threshold. A global binarization threshold is preferably not determined, even though this would be possible but rather a respective local binarization threshold for a neighborhood of an observed code module; the same applies accordingly to the fluctuation range. Whether the gray scale values of a code module significantly differ from the binarization threshold can then be measured at the fluctuation range, for example $x$ standard deviations where $x \leq 1$, $x \leq 0.5$ or the like. How great the distance from the binarization threshold is can be additionally given as a confidence value.

In a step S7, the found defects 30, that have first been localized in a code module, are associated with a code word. It results from the respective code standard and will therefore not be described in more detail. It is therefore known at this point in time which code words are affected by defects 30 in how many code modules; in addition, which criterion with which confidence the defect has recognized the defect 30 or a code word affected by a defect.

In a step S8, the confidence values are used to find $r_{max}$ code words to be corrected. In this respect, $r_{max}$ preferably corresponds to the maximum number of code modules that are affected by a defect 30 and with which a subsequent error correction process or in particular Reed-Solomon process still copes. What this means will subsequently be explained in more detail. First, however, the prioritization and the confidence values should be looked at. 50% per code module can be assumed as the confidence for the edge criterion, which corresponds to the base probability that each code module is light or dark. The formula $$1 - \left(\frac{1}{2}\right)^{n_1}$$

then results from this for $n_1$ code modules affected by a defect 30. For the binarization criterion, the distance from the binarization threshold rescaled in a linear or nonlinear manner into a probability can indicate the confidence for a single code module that there is a binarization error, with the probability being the higher, the closer the code module comes to the binarization threshold. The confidences of the code modules of a code word are multiplied for the code word. If both criteria are hit in a code word, the confidences are combined.

A minimum confidence can now be specified to obtain code words that have been affected by a defect 30 with a sufficient reliability. A selection of at most $r_{max}$ code words can be made from this, preferably those with the highest confidence, but other selections, including a random selection, are also possible. Different selections can in particular be made for repeat reading attempts.

The parameter $r_{max}$ results from the error correction capacity. A (n,k) Reed-Solomon code of a message length n and a data length k<n accordingly has n–k error correction words. If r defects 30 or code words affected by a defect 30 are marked therein, this corresponds to a (n–r, k) Reed-Solomon code with respect to the decoding safety. There is thus no longer an error check at r=n–k. A maximum of $r_{max}$=n–k–2 defects 30 or code words affected thereby may therefore be marked, with the limit possibly also being set more conservatively depending on the block length. The limit applies to every block with codes having a plurality of error correction blocks.

In a step S9, an attempt is now made to read the optical code 20 with an error correction process. With knowledge of the defects 30 or of the code words affected thereby, the error correction process can correct twice as many errors since no correction words are used up for the localization of errors. In the ideal case, the reading attempt leads to success in step 10; the optical code 20 is read. If the reading attempt fails, further reading attempts can be made if the application still provides decoding time for this. A different selection of defects 30 or of code words affected thereby can in particular be made for this purpose in step S8. If the decoding time is used up or if there are no sensible further possibilities for a reading attempt, the optical code 20 remains unreadable in a step S11 and a corresponding reading error can be output.

The probability for an error correction can be calculated based on the paper by Isaac Sofair named in the introduction. For example, it results for a QR code of Version 3 with an error correction level H that for r=n–k–2 the probability for an error correction amounts to approximately 0.012%. For r=n–k–4, the probability already amounts to only approximately one error correction per 100 million decodings. This is easily sufficient for most code reading applications. In the specific case of the QR code of Version 3 with an error correction level H with 22 error correction words per block and 2 blocks, this permits the marking of up to 18 defects 30 per block and thus a total of 36 defects or code words affected thereby.

It must be emphasized that the flowchart in accordance with FIG. 3 represents a preferred embodiment. It is not necessary to carry out all the steps. Only one of the criteria in the upper part can in particular be checked or the evaluation with a confidence can be dispensed with. In the latter case, the found defects 30 or code words affected thereby are in particular marked without then again selecting or prioritizing.

The invention claimed is:

1. A method of reading an optical code, said method comprising:
   recording image data having the optical code, wherein code modules in the image data each have a module size that indicates how large the respective one of the code modules is in picture elements of the image data;

determining defects, wherein a defect is a region in the image data in which at least one of the code modules is not recognizable; and evaluating the image data by reading code words, wherein each of the code words comprises a plurality of the code modules, wherein the defects are determined using an edge criterion and/or a binarization criterion, wherein the edge criterion evaluates whether one of the code modules is in an edge-free region of the image data that is larger than a specified multiple of the module size corresponding thereto, an edge detection in the image data being further performed, wherein a distance from a next edge is determined for a picture element per position of one of the code modules, the edge criterion being deemed satisfied in the picture element when the distance corresponds to at least a specified distance, and wherein the binarization criterion evaluates whether one of the code modules having gray scale values close to a binarization threshold has been recorded, wherein the binarization criterion is deemed satisfied at the picture element when the gray scale value of the picture element remains within an expected fluctuation range around the binarization threshold.

2. The method in accordance with claim 1, wherein an edge correction in the image data is carried out for the evaluation with the edge criterion.

3. The method in accordance with claim 2, wherein the edge correction in the image data is carried out after blur has been artificially produced beforehand.

4. The method in accordance with claim 1, wherein the optical code is read using an error correction method.

5. The method in accordance with claim 4, wherein the error correction method comprises a Reed-Solomon process.

6. The method in accordance with claim 4, wherein the defects are communicated to the error correction process as additional input values.

7. The method in accordance with claim 6, wherein a number of the code words affected by defects corresponding to an error correction capacity of the error correction process are communicated to the error correction process.

8. The method in accordance with claim 6, wherein a plurality of reading attempts are made with the error correction process and respective different ones of the code words affected by defects are communicated to the error reading process in the reading attempts.

9. The method in accordance with claim 6, wherein a decision as to which of the code words affected by defects are communicated to the correction process according to a confidence value.

10. The method in accordance with claim 9, wherein the confidence value is calculated from the edge criterion and/or the binarization criterion.

11. The method in accordance with claim 10, wherein the edge criterion in accordance with the formula $$1 - \left(\frac{1}{2}\right)^{n_1}$$

contributes to the confidence value, with $n_1$ being the number of the code modules affected by a defect.

12. The method in accordance with claim 10,
wherein the binarization criterion contributes the more to the confidence value, the closer to the gray scale value of the picture element looked at with the binarization criterion is to the binarization threshold.

13. An optoelectronic code reader having at least one light reception element for generating image data from received light and having a control and evaluation unit configured to implement the method of reading an optical code in accordance with claim 1.

14. A method of reading an optical code said method comprising:
recording image data having the optical code, wherein code modules in the image data each have a module size that indicates how large the respective one of the code modules is in picture elements of the image data;
determining defects, wherein a defect is a region in the image data in which at least one of the code modules is not recognizable;

evaluating the image data by reading code words, wherein each of the code words comprises a plurality of the code modules; and reading the optical code using an error correction method, the defects being used as input values for the error correction method such that correction is performed for the defects, wherein the defects are determined using an edge criterion and/or a binarization criterion, wherein the edge criterion evaluates whether one of the code modules is in an edge-free region of the image data that is larger than a specified multiple of the module size corresponding thereto, and wherein the binarization criterion evaluates whether one of the code modules having gray scale values close to a binarization threshold has been recorded.

\* \* \* \* \*